United States Patent
Plude et al.

(10) Patent No.: US 7,880,460 B2
(45) Date of Patent: Feb. 1, 2011

(54) HARDWARE IN THE LOOP MOTOR SIMULATION

(75) Inventors: Curtis J. Plude, Belvidere, IL (US); Raymond J. Beckman, Jr., Genoa, IL (US); Donal E. Baker, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 427 days.

(21) Appl. No.: 12/228,319

(22) Filed: Aug. 12, 2008

(65) Prior Publication Data
US 2010/0039120 A1 Feb. 18, 2010

(51) Int. Cl.
G01R 19/00 (2006.01)
G01R 31/02 (2006.01)
G06G 7/62 (2006.01)

(52) U.S. Cl. .................. 324/76.11; 318/490; 703/13; 703/14

(58) Field of Classification Search ................ 324/537, 324/500, 76.11, 76.79, 76.81, 158.1, 555; 318/490; 322/99; 702/108, 113, 117, 124, 702/126; 703/3, 13, 14, 16, 17
See application file for complete search history.

(56) References Cited

U.S. PATENT DOCUMENTS

| 4,922,400 | A | | 5/1990 | Cook |
| 4,996,477 | A | * | 2/1991 | Keeler et al. ........... 324/765.01 |
| 5,513,058 | A | * | 4/1996 | Hollenbeck .................. 361/36 |
| 5,524,498 | A | | 6/1996 | Thompson et al. |
| 6,892,170 | B1 | * | 5/2005 | Du et al. ........................ 703/13 |
| 7,109,681 | B2 | | 9/2006 | Baker et al. |
| 2005/0284245 | A1 | * | 12/2005 | Chen et al. ............... 74/388 PS |
| 2006/0038530 | A1 | * | 2/2006 | Holling ...................... 318/807 |

\* cited by examiner

*Primary Examiner*—Hoai-An D Nguyen
(74) *Attorney, Agent, or Firm*—Kinney & Lange, P.A.

(57) ABSTRACT

A simulator system is connected to simulate the connection of a mechanically loaded motor to a motor controller/driver. The simulator system includes a current transformer circuit for monitoring AC output currents provided by the motor controller/driver. A simulation controller calculates, based on the monitored AC output currents, dynamic load voltages that simulate the response that would be generated by a mechanically loaded motor based on the AC output currents provided by the motor controller/driver. A number of power supplies amplify the dynamic loading calculated by the simulation controller to generate a dynamic loading that opposes the AC output currents provided by the motor controller/driver.

13 Claims, 2 Drawing Sheets

HARDWARE IN THE LOOP MOTOR SIMULATION

BACKGROUND

The present invention relates to a simulation system for use in testing motor controllers/drivers, and in particular to a simulation system that provides feedback simulating the loading of a mechanically loaded motor.

The operation of AC machines is determined by the frequency, amplitude and position of AC currents provided to the motor. To this end, most motor systems include a motor controller/driver that selectively controls the AC current to obtain the desired motor performance.

Testing the operation and performance of the motor controller/driver is typically done by either connecting the motor controller/driver to an actual motor and load, or through basic simulation of the inputs and output of the motor controller/driver. Both methods offer potential benefits and drawbacks. For instance, testing the motor controller/driver with an actual motor and load allows the actual motor response to be monitored. In particular, as the speed of the motor increases, the rotating magnetic field induces a back electromotive force (BEMF) that opposes the AC power provided by the motor controller/driver. Employing a mechanically loaded motor allows the motor controller/driver to be tested in the presence of this type of electrical response. However, during testing it is typically desirable to run the motor and load through failure scenarios in which the motor and/or load may be damaged. Because the test of failure scenarios can result in damage or destruction of the motor or load, this type of test can be prohibitively expensive.

Simulations provide an inexpensive alternative to mechanically loading the motor controller/driver directly. Simulations typically observe the waveforms generated by the inverter. However, this type of simulation does not include generation of the actual AC outputs provided to the motor or the electrical response generated by a mechanically loaded motor in response to the actual AC outputs. Thus, the simulation does not provide feedback opposing the output of the motor controller/driver as would happen in a motor controller/driver connected to a mechanically loaded motor.

A simulation system that overcomes these obstacles would therefore be desirable.

SUMMARY

Described herein is a simulation system that is used in testing the operation of a motor controller driver. The motor controller/driver converts direct current (DC) power to alternating current (AC) power that is provided to a simulator. In response to the AC power provided by the motor controller/driver, the simulator generates a dynamic load voltage that is provided as feedback to oppose the AC power provided by the motor controller/driver.

DETAILED DESCRIPTION

The present invention provides a hardware-in-the-loop simulator that provides dynamic load voltages as feedback to a motor controller/driver to simulate the connection of a motor and load.

Figure 1:
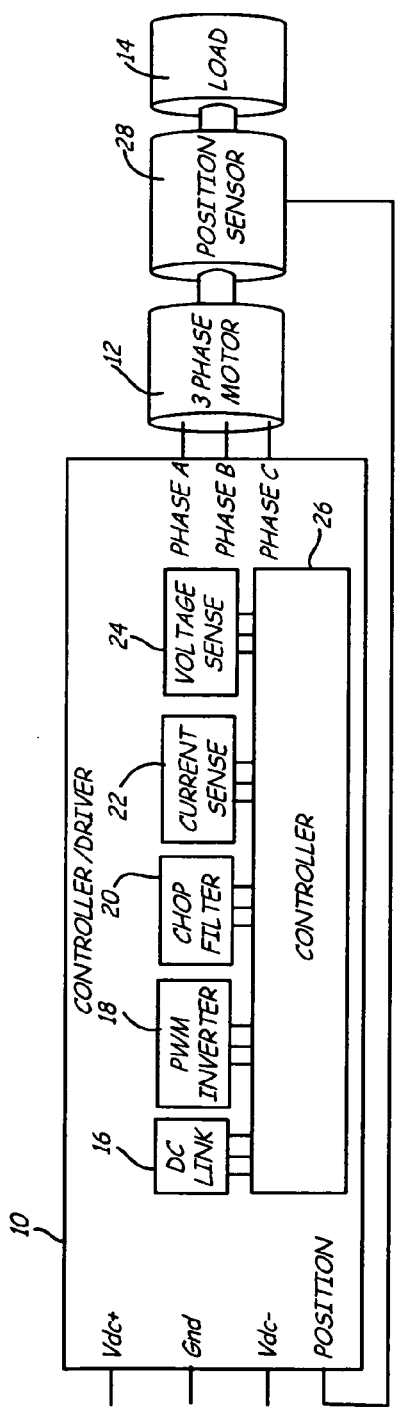
FIG. 1 is a block diagram illustrating the connection of a motor controller/driver to a three-phase motor and load as known in the prior art.

FIG. 1 is a block diagram illustrating the connection of motor controller/driver 10 to three-phase motor 12 and load 14 as known in the prior art. Motor controller/driver 10 includes direct current (DC) inputs $V_{dc+}$, $V_{dc-}$, position input (labeled 'Position'), DC link 16, pulse-width modulation (PWM) inverter 18, chop filter 20, current sense circuit 22, voltage sense circuit 24, controller 26 and alternating current (AC) outputs (labeled 'Phase A', 'Phase B', and 'Phase C').

Motor controller/driver 10 is connected to three-phase motor 12, which is in turn connected through position sensor 28 to load 14. Motor controller/driver 10 converts the DC input to a three-phase AC output that is provided to three-phase motor 12. In response to the AC output provided by motor controller/driver 10, three-phase motor 12 drives load 14. Driving a mechanically loaded motor (i.e., a motor connected to a load) results in a particular loading that opposes the AC output provided by motor controller/driver 10. For instance, as three-phase motor 12 begins to rotate, a back electromotive force (BEMF) is generated that opposes the AC output provided by motor controller/driver 10. The mechanical loading of three-phase motor 12 presents an inertial force that also tends to oppose the AC output of motor controller/driver 10.

Motor controller/driver 10 controls the operation of three-phase motor 12 by monitoring the AC output provided to three-phase motor 12 and the position of the three-phase motor 12. Current sense circuit 22 and voltage sense circuit 24 monitor the current and voltage provided to three-phase motor 12, respectively, including the effect of the BEMF generated by three-phase motor 12 and mechanical load 14. Position sensor 28 monitors the rotational position of three-phase motor 12 and provides the result as feedback to motor controller/driver 10.

Testing of motor controller/driver 10 therefore entails operating three-phase motor 12 and load 14 in a variety of scenarios and monitoring the response of motor controller/driver 10. Benefits of this approach include the fact that motor controller/driver 10 is providing full power to a motor connected to a load. The electrical response generated by the mechanically loaded motor in response to the AC outputs provided by motor controller/driver 10 varies depending on a number of factors, such as the speed of motor 12 and the mechanical resistance provided by load 14, such that the electrical response is dynamic in nature. This approach has several drawbacks however, including the cost associated with connecting a motor and load to motor controller/driver 10 for each test operation. In addition, failure scenario testing may result in damage to both the motor and load, further adding to the cost of testing motor controller/driver 10.

Figure 2:
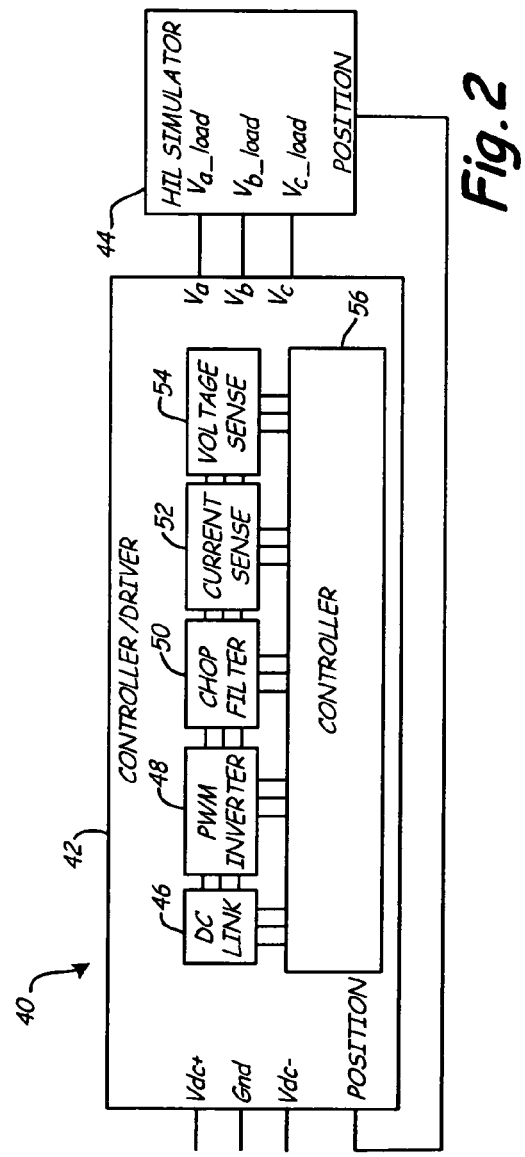
FIG. 2 is a block diagram illustrating the connection of a motor controller/driver to a hardware-in-the-loop simulator according to an embodiment of the present invention.

FIG. 2 is a block diagram that illustrates motor controller/driver simulation system 40, which simulates the effect of connecting a motor and load to motor controller/driver 42 with hardware-in-the-loop (HIL) simulator 44. In particular, HIL simulator 44 acts to simulate the dynamic electrical load that would typically be generated by a motor and mechanical load (such as those shown in FIG. 1). The feedback provided by HIL simulator 44 allows motor controller/driver 42 to be tested without the presence of an actual motor and load. Furthermore, HIL simulator 44 allows motor controller/driver 42 to be evaluated during a variety of failure scenarios.

In the embodiment shown in FIG. 2, motor controller/driver 42 includes DC inputs $V_{dc+}$ and $V_{dc-}$, position input 'Position', DC link 46, PWM inverter 48, chop filter 50, current sense circuit 52, voltage sense circuit 54, controller 56, and AC outputs $v_a$, $v_b$, and $v_c$. Motor controller/driver 42 operates in the same manner as motor controller/driver 10 described with respect to FIG. 1, wherein DC power provided to DC inputs $V_{dc+}$ and $V_{dc-}$ is converted to a desired AC output $v_a$, $v_b$, and $v_c$. However, rather than provide the AC outputs $v_a$, $v_b$, and $v_c$ to a mechanically loaded motor, the present invention provides them to HIL simulator 44, which simulates the response of a mechanically loaded motor to the AC outputs, including the dynamic load voltages (labeled $v_{a\_load}$, $v_{b\_load}$, and $v_{c\_load}$) provided as feedback to oppose the AC outputs $v_a$, $v_b$, and $v_c$ provided by motor controller/driver 42.

With respect to motor controller/driver 42, PWM inverter 48 is selectively controlled by controller 56 to convert the DC signal provided on DC link 46 to three-phase AC power that is provided to chop filter 50. Controller 56 monitors a number of inputs, including the DC link voltage on DC link 46, the position of the rotor as provided by HIL simulator 44, as well as the magnitude and phase of both the current and voltage of the AC output voltage $v_a$, $v_b$, and $v_c$. Based on these monitored inputs, controller 56 generates PWM control signals that are provided to PWM inverter 48 such that the resulting AC output has a desired magnitude, phase, and frequency. Switching frequencies associated with the PWM inverter are filtered from the desired AC output signal by reactive components employed by chop filter 50. Motor controller/driver 42 is exemplary in nature. Persons of ordinary skill in the art will recognize that motor controller/driver 42 may be implemented in a number of ways to generate the desired AC output.

AC outputs generated by motor controller/driver 42 are provided to HIL simulator 44. As described above, HIL simulator 44 simulates the dynamic load voltages provided by a three-phase motor connected to a mechanical load, such as the three-phase motor and load illustrated in FIG. 1. The dynamic load voltages are provided as feedback to oppose the AC outputs provided by motor controller/driver 42. In this way, the operation of motor controller/driver 42 can be tested and verified in an environment that simulates the dynamic loading effects, such as the BEMF generated by a mechanically loaded motor. In particular, HIL simulator 44 controls the magnitude and position of the load voltages $v_{a\_load}$, $v_{b\_load}$, and $v_{c\_load}$ to simulate the response of a mechanically loaded motor.

As discussed with respect to FIG. 2, motor controller/driver 42 monitors the magnitude and position of the AC outputs (via current sense circuit 52 and voltage sense circuit 54), including the effect the load voltages $v_{a\_load}$, $v_{b\_load}$, and $v_{c\_load}$ provided in feedback by HIL simulator 44 have on the AC output. In response, motor controller/driver 42 implements control algorithms to modify the AC output as desired. The response by motor controller/driver 42 can be monitored and examined as part of a test procedure to determine whether motor controller/driver 42 is operating correctly.

Figure 3:
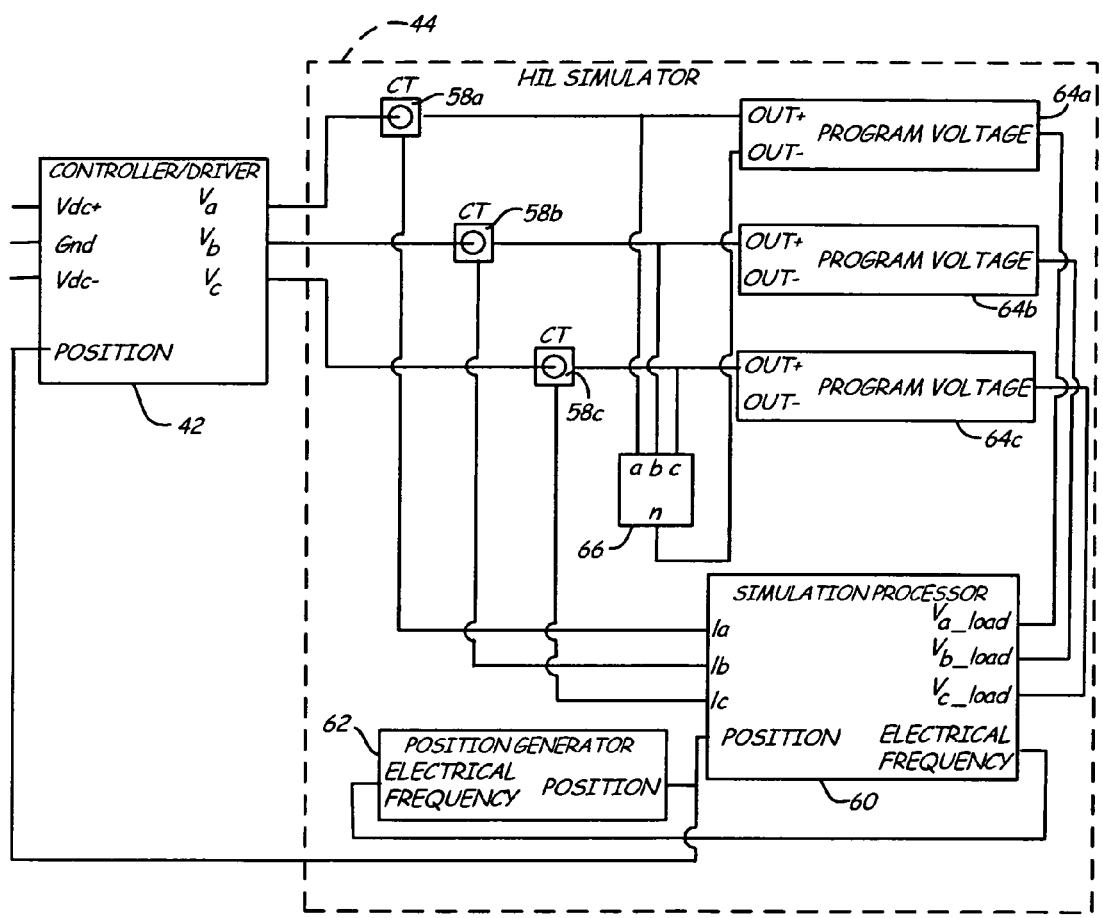
FIG. 3 is a block diagram illustrating in additional detail the operation of the hardware-in-the-loop simulator according to an embodiment of the present invention.

FIG. 3 is a block diagram illustrating in additional detail HIL simulator 44, which includes current transformers 58a, 58b, and 58c, simulator processor 60, position generator 62, four-quadrant power supplies 64a, 64b and 64c, and neutral forming transformer (NFT) 66. In particular, AC outputs $v_a$, $v_b$, and $v_c$ generated by motor controller/driver 42 are provided to current transformers 58a, 58b, and 58c, which act to convert the AC output current to a representative signal that can be provided to simulator controller 60. In one embodiment, simulator controller 60 is implemented with a digital signal processor (DSP) programmed to simulate how a mechanically loaded motor would respond to the AC output currents provided by motor controller/driver 42. Thus, simulator controller generates state estimates that describe how the simulated motor would respond to AC output currents provided by motor controller/driver 42. The state estimates calculated by simulator controller 60 include the dynamic load voltages (represented by outputs $v_{a\_load}$, $v_{b\_load}$, and $v_{c\_load}$) of the simulated motor and the speed of the simulated motor (represented by the output labeled 'electrical frequency'), both of which are provided as outputs by simulator controller 60.

Simulator controller 60 is responsive to the monitored AC currents, but outputs generated by simulator controller 60 may be based, in addition, on programmed characteristics of the mechanically loaded motor being simulated. Thus, simulator controller 60 may take into account inertial characteristics of the motor being simulated, as well as details regarding the resistance, time-constant, etc., associated with the simulated motor. In this way, simulator controller 60 is able to accurately estimate the operational state of the mechanically loaded motor being simulated, including the dynamic load voltages provided by the simulated motor. The dynamic load voltages $v_{a\_load}$, $v_{b\_load}$, and $v_{c\_load}$ represents the electrical and mechanical forces that would oppose the AC outputs $v_a$, $v_b$, and $v_c$ provided by motor controller/driver 42 in an actual system.

The estimated speed of the mechanically loaded motor being simulated is represented by the output labeled 'Electrical Frequency'. The speed estimate is provided to positional generator 62, which calculates the position of the motor and provides the calculated position to simulator controller 60 as feedback. In this way, the state estimates associated with the simulated motor take into account the estimated position of the motor and as a result how the AC output currents interact with the simulated motor defined by a certain position. The positional estimate generated by position generator 62 is also provided as feedback to motor controller/driver 42. In this way, position generator 62 acts to provide the same type of output that would typically be provided by a position sensor (such as position sensor 28 as shown in FIG. 1). In one embodiment, position generator 62 includes a processor and a waveform generator that converts the speed estimate (i.e., electrical frequency) provided by simulator controller 60 to an amplitude-modulated (AM) sine/cosine function that represents the mechanical and electrical position of the simulated motor rotor.

Four-quadrant power supplies 64a, 64b, and 64c and neutral forming transformer 66 amplify the load voltages $v_{a\_load}$, $v_{b\_load}$, and $v_{c\_load}$ calculated by simulator controller 60 to generate dynamic load voltages that oppose the AC outputs provided by the motor controller/driver, simulating the actual loading of a mechanically loaded motor. For instance, the amplified dynamic load voltages $v_{a\_load}$, $v_{b\_load}$, and $v_{c\_load}$ represent the mechanical and electrical forces (e.g., BEMF) that oppose the AC output dynamic load voltages $v_a$, $v_b$, and $v_c$ provided by motor controller/driver 42. The positive output of each four-quadrant power supply 64a, 64b and 64c is connected to AC outputs $v_a$, $v_b$, and $v_c$, respectively, of motor controller/driver 42 to oppose the AC outputs provided by motor controller/driver 42. The negative output of each four-quadrant power supply 64a, 64b and 64c is connected through a neutral input 'n' of neutral forming transformer (NFT) 66, which acts as a neutral reference for each of the four-quadrant amplifiers. In this way, four-quadrant power supplies 64a, 64b and 64c provide dynamic load voltages as feedback to motor controller/driver 42 to simulate the electrical effect provided by a mechanically loaded motor.

In response to the feedback (i.e., dynamic load voltages) provided by HIL simulator 44, motor controller/driver 42 responds to control the simulated motor in a desired manner. Operation of motor controller/driver 42 can be verified by monitoring the operation of motor controller/driver 42 in response to HIL simulator 44. In this way, the ability of motor controller/driver 42 to effectively control a mechanically loaded motor can be cheaply and efficiently tested. In addition, motor controller/driver 42 can be operated through a range of operational states, including failure analysis states, without the costs associated with testing the motor controller/driver in conjunction with an actual motor and load.

Although the present invention has been described with reference to preferred embodiments, workers skilled in the art will recognize that changes may be made in form and detail without departing from the spirit and scope of the invention.

The invention of claimed is:

1. A simulation system comprising:
    a motor controller for converting direct-current (DC) power to an alternating current (AC) power; and
    a simulator for testing the motor controller, the simulator connected to receive the AC power provided by the motor controller and to generate in response to the AC power a dynamic loading voltage that is provided as feedback to oppose the AC power provided by the motor controller, wherein the dynamic loading simulates an electrical response generated by a mechanically loaded motor.

2. The simulation system of claim 1, wherein the simulator includes:
    a current transformer connected to monitor AC current provided by the motor controller;
    a simulator controller that calculates the dynamic load voltages and state estimates associated with the simulated mechanically loaded motor based on the AC current monitored by the current transformer, wherein the simulator controller generates a signal representation of the calculated dynamic load voltages; and
    four-quadrant power supplies responsive to the calculated dynamic load voltages generated by the simulator controller to generate the dynamic load voltages that are provided to oppose the AC current provided by the motor controller, wherein the dynamic load voltages provided by each of the four-quadrant power supplies simulate the connection of a mechanically loaded motor to the motor controller.

3. The simulation system of claim 2, wherein the state estimate generated by the simulator controller includes a speed estimate of the simulated mechanically loaded motor.

4. The simulation system of claim 3, further including:
    a positional generator connected to provide feedback to the simulator controller regarding a position of the simulator mechanically loaded motor in response to the speed estimate generated by the simulator controller.

5. The simulation system of claim 3, wherein the simulator controller calculates the dynamic load voltages and state estimates based, in addition, on inertial characteristics associated with the mechanically loaded motor being simulated and previous estimates regarding the state of the simulated motor.

6. The simulation system of claim 1, wherein the motor controller includes:
    a pulse width modulated (PWM) inverter for converting direct current (DC) signals to alternating current (AC) signals;
    a chop filter for filtering high-frequency noise from the AC signals generated by the PWM inverter;
    a sense circuit that monitors amplitude and position of AC outputs provided to the simulator controller and the dynamic load voltages provided in response by the simulator; and
    a controller connected to control the operation of the PWM inverter to generate desired AC outputs based on the monitored AC outputs as modified by the dynamic loading provided by the simulator.

7. The simulation system of claim 6, wherein the sense circuit includes a voltage sense circuit for sensing amplitude and phase of the AC output voltages and a current sense circuit for sensing amplitude and phase of the AC output currents.

8. A hardware-in-the-loop (HIL) simulator for testing a motor controller, the HIL simulator comprising:
    current transformer circuits operably connected to monitor AC output currents provided by the motor controller and to generate a signal representative of the monitored AC output currents;
    a simulation controller having inputs operably connected to receive the representative current signals generated by the current transformer circuits and an input operably connected to receive a position signal, wherein the simulation controller calculates a dynamic load voltage generated by a mechanically loaded motor based on the representative current signals and the position signal; and
    a power supply operably connected to generate the dynamic load voltage calculated by the simulation controller and to provide the generated load voltages as feedback to oppose the AC output current provided by the motor controller.

9. The HIL simulator of claim 8, wherein the simulation controller stores one or more characteristics describing physical attributes of the mechanically loaded motor being simulated.

10. The HIL simulator of claim 9, wherein the characteristics stored by the simulation controller comprise at least one of the following: inertial characteristics associated with the simulated motor, resistive characteristics associated with the simulated motor, and time-step characteristics of the simulated motor.

11. The HIL simulator of claim 8, wherein the simulation controller generates a state estimate based on the AC output currents provided by the motor controller.

12. The HIL simulator of claim 11, further including:
    a positional generator operably connected to generate the positional estimate provided as feedback to the simulation controller, wherein the positional estimate describes a rotor position of the mechanically loaded motor being simulated.

13. The HIL simulator of claim 12, wherein the positional estimate is provided as feedback to the motor controller.

* * * * *